United States Patent
Wilger (10) Patent No.: US 10,624,257 B2
(45) Date of Patent: Apr. 21, 2020

(54) CONTROLLING APPLICATION RATES IN LIQUID APPLICATORS

(71) Applicant: Wilfred H. Wilger, Saskatoon (CA)

(72) Inventor: Wilfred H. Wilger, Saskatoon (CA)

( * ) Notice: Subject to any disclaimer, the term of this patent is extended or adjusted under 35 U.S.C. 154(b) by 94 days.

(21) Appl. No.: 16/071,775

(22) PCT Filed: Dec. 21, 2016

(86) PCT No.: PCT/CA2016/051517
§ 371 (c)(1),
(2) Date: Jul. 20, 2018

(87) PCT Pub. No.: WO2017/124175
PCT Pub. Date: Jul. 27, 2017

(65) Prior Publication Data
US 2019/0029170 A1   Jan. 31, 2019

(30) Foreign Application Priority Data
Jan. 21, 2016   (CA) .................................... 2918278

(51) Int. Cl.
*A01C 23/00* (2006.01)
*H02K 11/215* (2016.01)
(Continued)

(52) U.S. Cl.
CPC ......... *A01C 23/007* (2013.01); *A01M 7/0089* (2013.01); *B05B 12/006* (2013.01);
(Continued)

(58) Field of Classification Search
CPC .... A01C 23/007; H02K 11/215; H02K 7/116; A01M 7/0089; B05B 12/006;
(Continued)

(56) References Cited

U.S. PATENT DOCUMENTS

| 4,530,463 A | 7/1985 | Hiniker et al. |
| 5,134,961 A | 8/1992 | Giles et al. |

(Continued)

OTHER PUBLICATIONS

International Search Report for Application No. PCT/CA2016/051517, dated Mar. 23, 2017 (3 pgs).
(Continued)

*Primary Examiner* — Mohammad Ali
*Assistant Examiner* — Joshua T Sanders
(74) *Attorney, Agent, or Firm* — Patterson Thuente Peders, P.A.

(57) ABSTRACT

A liquid application apparatus includes a plurality of control assemblies, each with input and output ports, a liquid information sensor, and a position controlled valve activator operative to activate a valve to vary a flow opening size. A controller receives liquid and position information and sets each control assembly to dispense the same desired rate of flow of liquid from the each output port by activating each valve activator to move the valve activator to a valve position where the size of the flow opening achieves the desired rate of flow. The controller is operative to compare a position of the valve activator in a first control assembly with the positions of the valve activators in other control assemblies to determine a malfunction. The liquid information sensor is typically a flow sensor or a pressure sensor.

27 Claims, 2 Drawing Sheets

(51) Int. Cl.
*A01M 7/00* (2006.01)
*B05B 12/00* (2018.01)
*B05B 12/02* (2006.01)
*F16K 31/04* (2006.01)
*G01P 3/487* (2006.01)
*G05B 19/042* (2006.01)
*G05D 7/06* (2006.01)
*H02K 7/116* (2006.01)
*A01C 23/04* (2006.01)

(52) U.S. Cl.
CPC ............ *B05B 12/02* (2013.01); *F16K 31/046* (2013.01); *G01P 3/487* (2013.01); *G05B 19/042* (2013.01); *G05D 7/0623* (2013.01); *H02K 7/116* (2013.01); *H02K 11/215* (2016.01); *A01C 23/047* (2013.01); *A01M 7/0042* (2013.01); *G05B 2219/25312* (2013.01)

(58) Field of Classification Search
CPC ....... B05B 12/02; F16K 31/046; G01P 3/487; G05B 19/042; G05D 7/0623

USPC ........................................................ 700/283
See application file for complete search history.

(56) References Cited

U.S. PATENT DOCUMENTS

| | | |
|---|---|---|
| 6,126,088 A | 10/2000 | Wilger et al. |
| 7,124,964 B2 | 10/2006 | Bui |
| 7,162,961 B2* | 1/2007 | Grimm ................ A01C 23/024 |
| | | 111/119 |
| 8,523,085 B2 | 9/2013 | Grimm et al. |
| 2012/0228395 A1 | 9/2012 | Needham et al. |
| 2015/0115058 A1* | 4/2015 | Wilger ................ A01G 25/165 |
| | | 239/61 |

OTHER PUBLICATIONS

Written Opinion for Application No. PCT/CA2016/051517, dated Mar. 23, 2017 (7 pgs).

\* cited by examiner

CONTROLLING APPLICATION RATES IN LIQUID APPLICATORS

RELATED APPLICATION

The present application is a National Phase entry of PCT Application No. PCT/CA2016/051517, filed Dec. 21, 2016, which claims priority to Canadian Application No. 2,918,278, filed Jan. 21, 2016, said applications being hereby incorporated herein by reference in their entirety.

This disclosure relates to the field of liquid application equipment and in particular an apparatus for controlling the flow of liquid to achieve a desired application rate and detecting malfunctions which adversely affect the application rate.

BACKGROUND

There are many applications where it is necessary to dispense a liquids at a desired rate. In agriculture for example liquid chemicals such as pesticides, fungicides, and herbicides are applied to crops or field surfaces through spray nozzles mounted on a spraying vehicle. Agricultural sprayers then must accurately dispense the liquid over the desired area of target surface. This has typically been accomplished by providing a spray nozzle having a set operating pressure such that when operated at that pressure, the nozzle accurately dispensed a known amount of liquid per time unit, or known flow rate. Operating the sprayer at a known speed then accurately resulted in the correct amount of fluid being dispensed over a given area, however if the sprayer speed increased or decreased the application rate decreased or increased accordingly.

The nozzles are spaced apart on a sprayer boom, perpendicular to the direction of travel, at a standard spacing distance which corresponds to the spray pattern of the nozzles. The same size nozzle is in operating position at each nozzle location, providing a consistent application rate across the width of the sprayer. The most common spray pattern is a flat-fan pattern, and the nozzles are generally rotated approximately 10 degrees from being perpendicular to the direction of travel in order that the overlapping spray patterns do not intersect and interfere with each other. In order to provide a spray pattern that provides satisfactory full coverage of the target area being sprayed these sprayer nozzles are limited to operation within a specified pressure range, typically for example 20-60 pounds per square inch (psi). To provide an application rate outside the specified pressure range, the nozzles are changed.

Rate controllers are available which measure the total flow of fluid along the boom to the nozzles and automatically vary the pressure as the speed varies, maintaining a total flow to the nozzles that will maintain a stable application rate along the boom as speed varies. These rate controllers can also be used to vary the application rate by maintaining a constant speed, and varying the pressure. Variable application rates have become desirable with the advent of field mapping, where different areas of a field are best treated with different rates of the particular liquid being applied.

Modern agriculture/horticulture sprayers typically have a boom with multiple spray sections that can be independently controlled. Usually a master control means is used to control the entire boom, while each section may have its own control or switch. Liquid pressure in each section can be varied by a rate controller to apply different rates to field portions passed over by each section, and flow to any section can be stopped completely if desired.

Also in agriculture liquid fertilizer is dispensed through nozzles that do not provide full coverage, but rather simply drop the liquid fertilizer into a furrow or dribble the liquid onto the ground. A typical liquid fertilizer applicator will comprise a ground driven pump supplying pressurized liquid to a plurality of spaced apart nozzles that dispense a stream or streams of liquid onto the ground. There is no requirement for a defined spray pattern so the pressure can vary more widely. The nozzles define an orifice or orifices of a known size such that they dispense a known rate at a known pressure. With a ground driven pump the pressure varies with speed so at a lower speed the pressure is lower and the rate of flow through the nozzles is lower, and the application rate per unit of area remains substantially constant as speed varies. Hydraulic drive pumps are also commonly used with a control system that controls pressure as speed varies. Liquid fertilizer application is commonly done at the same time as seeding, with the nozzles mounted on the seeding implement and a liquid fertilizer tank pulled behind. It is also known to apply liquid fertilizer using the conventional full coverage spraying equipment used for spraying herbicides, pesticides, however apply liquid fertilizer to a growing crop with full coverage nozzles can damage the crop and so it is common to change the type of nozzles used to nozzles that dispense a stream of liquid.

External location and guidance systems utilizing Global Positioning Satellites (GPS), local broadcasting towers, and the like have allowed sprayers to be located and also guided precisely, and also provide precision control of application rates and avoidance of spray overlap as described for example in U.S. Pat. Nos. 6,522,948 and 6,877,675 to Benneweis.

Considerable precision in the controls is desirable, as discussed in U.S. Pat. No. 8,352,130 to Mitchell which provides a system for anticipating a change in the ground speed of the spraying vehicle such that a lag that otherwise would occur in the rate of product input delivered is reduced.

An externally guided spraying system is also described in U.S. Pat. No. 7,124,964 to Bui which discloses a flexible, self-adjusting flow nozzle where the self-adjusting capability of the spray nozzle enables the creation of an automatic spray system that includes a computerized controller that receives inputs pertaining to vehicle speed, geographic vehicle position, and flow rate and/or fluid pressure which are compared against a predetermined flow plan for a given field and the controller automatically adjusts the flow rate to the nozzles accordingly.

U.S. Pat. No. 7,874,197 to Jackson, et al. discloses an apparatus for manually measuring a rate of liquid flow through a spray nozzle includes a container with an opening in a top thereof adapted to receive a liquid discharge from a spray nozzle.

U.S. Pat. No. 7,395,769 to Jensen discloses a farm implement for applying a product to a row crop or a row seeded field wherein the implement has a plurality of spaced-apart product dispensers, such as spray nozzle, seed dispensers, and the like, where each of dispenser is individually automatically controlled by an external guidance system. The application rate of each dispenser is adjusted to compensate for the different ground speeds encountered during turns, and also to vary application rates according a field map indicating desired application rates for different field areas. Achieving a wide range of smoothly transitioning application rates with current spray nozzles is, however, problematic.

U.S. Pat. No. 6,126,088 to the present inventor Wilger discloses a nozzle mounting and control system for use in sprayers comprising multiple nozzles mounted in the operating position on a sprayer boom such that 2, 3, or more nozzles pass over the same target surface. Wide ranges of application rates are achieved by control valves operable to select which nozzles are open and operating at any given time. The valves may be remote controlled and may further incorporate a rate controller to maintain a chosen application rate by opening and closing appropriate valves as the sprayer speed varies, and/or by varying the pressure in the conduits supplying the nozzles.

SUMMARY OF THE INVENTION

The present disclosure provides a liquid application apparatus and a method for detecting malfunctions in a liquid application apparatus that overcome problems in the prior art.

In a first embodiment the present disclosure provides a liquid application apparatus comprising a pressurized liquid source directing a flow of liquid at a selected supply pressure through a supply conduit, and a plurality of control assemblies. Each control assembly comprises a control body with an input port connected to receive pressurized liquid from the supply conduit at the supply pressure, and an output port. Each control assembly further comprises a liquid information sensor and a position controlled valve activator, the valve activator operative to incrementally move a valve to increase or decrease a size of a flow opening between the input port and the output port. A controller is connected to receive liquid information from the liquid information sensor in each control assembly and valve position information from the valve activator in each control assembly and operative to activate each valve activator to move each valve activator to a valve position where the size of the corresponding flow opening achieves a desired rate of flow of liquid from the corresponding output port. The controller is operative to record the valve position of each valve activator that corresponds to the desired rate of flow of liquid from the corresponding output port.

In a second embodiment the present disclosure provides a liquid application apparatus comprising a pressurized liquid source directing a flow of liquid at a selected supply pressure through a supply conduit, and a plurality of control assemblies, each comprising a valve and a flow sensor enclosed in a control body. The flow sensor is operative to measure liquid flow through the control body and the control body has an input port connected to receive pressurized liquid from the supply conduit at the supply pressure, and an output port. A controller is connected to receive liquid flow information from each flow sensor and open or close the corresponding valve to increase or decrease a size of a flow opening between the input port and the output port to the size that achieves a desired rate of flow of liquid from the corresponding output port.

In a third embodiment the present disclosure provides a liquid fertilizer applicator apparatus comprising a fertilizer tank and a pump operative to draw liquid fertilizer from the tank and direct pressurized liquid fertilizer through a supply conduit at a selected supply pressure. A plurality of control assemblies is spaced along a width of an agricultural implement, each comprising a valve and a flow sensor enclosed in a control body, the flow sensor operative to measure liquid flow through the control body, the control body having an input port connected to receive pressurized liquid fertilizer from the supply conduit at the supply pressure, and an output port configured to direct liquid fertilizer to a desired location. Each control assembly comprises a valve activator connected to open and close the valve, and a controller is connected to receive liquid flow information from each flow sensor and valve position information from each valve activator and is operative to activate each valve activator to incrementally open or close the corresponding valve to increase or decrease the rate of flow of liquid fertilizer from the corresponding output port to achieve a desired rate of flow of liquid fertilizer through the output port.

In a fourth embodiment the present disclosure provides a method of determining a malfunction in a liquid application apparatus, where the liquid application apparatus comprises a plurality of control assemblies, each control assembly comprising a control body with an input port connected to receive pressurized liquid from a supply conduit at a supply pressure, and an output port, and each control assembly comprising a liquid information sensor and a position controlled valve activator, the valve activator operative to incrementally activate a valve to increase or decrease a size of a flow opening between the input port and the output port. The method comprises receiving liquid information from the liquid information sensor in each control assembly and valve position information from the valve activator in each control assembly and setting each control assembly to dispense the same desired rate of flow of liquid from the each output port by activating each valve activator to move the valve activator to a valve position where the size of the corresponding flow opening achieves the desired rate of flow, and comparing a position of the valve activator in a first control assembly with an average of the positions of the valve activators in other control assemblies to determine a malfunction.

The present disclosure provides a liquid application apparatus that can detect malfunctions such as nozzles that are the wrong size, blocked, or enlarged by wear or damage. In liquid applications such as in a liquid fertilizer apparatus where the liquid is not dispensed through pressure regulated nozzles, flow rates are detected directly by providing a flow sensor in the control body, and the controller simply activates the valve to open or close the flow opening until the desired flow rate is attained. A method of detecting malfunctions is provided as well.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
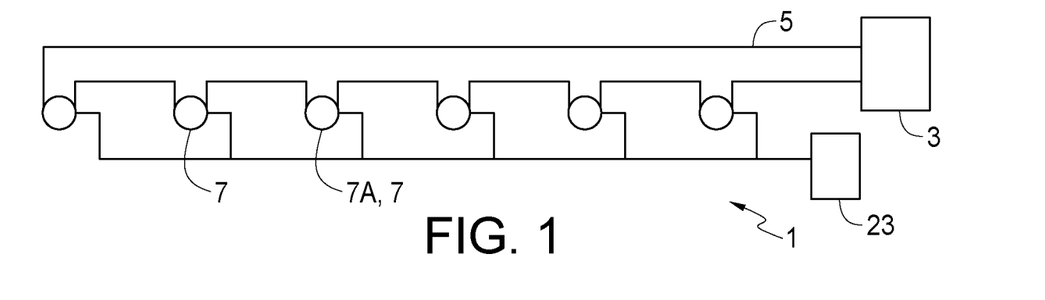
FIG. 1 is a schematic top view of an embodiment of the liquid application apparatus of the present disclosure.
Figure 2:
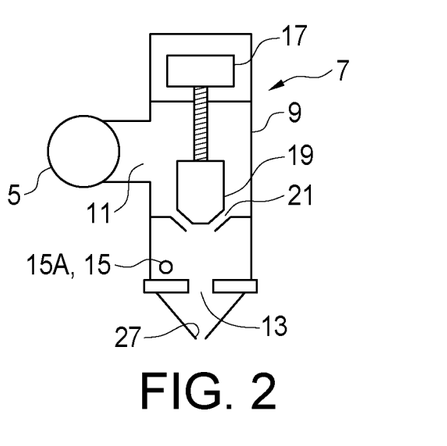
FIG. 2 is a schematic sectional side view of a control assembly of the embodiment of FIG. 1 with a spray nozzle connected to the output port.
Figure 3:
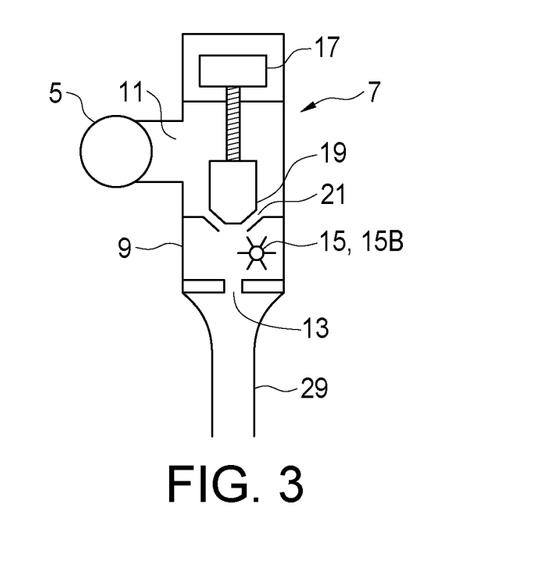
FIG. 3 is a schematic sectional side view of a control assembly of the embodiment of FIG. 1 where the output port is open to the atmosphere.

FIGS. 1-3 schematically illustrate an embodiment of a liquid application apparatus 1 of the present disclosure for use in agricultural and like industries where accurate dispensing of liquid materials is required. The apparatus 1 comprises a pressurized liquid source 3 directing a flow of liquid at a selected supply pressure through a supply conduit 5. A plurality of control assemblies 7 each comprises a control body 9 with an input port 11 connected to receive pressurized liquid from the supply conduit 5 at the supply pressure, and an output port 13.

Each control assembly 7 comprises a liquid information sensor 15 and a position controlled valve activator 17. The valve activator 17 is operative to incrementally activate a valve 19 to increase or decrease a size of a flow opening 21 between the input port 11 and the output port 13.

A controller 23 is connected to receive liquid information from the liquid information sensor 15 in each control assembly 7 and valve position information from the valve activator 17 in each control assembly 7 and then set each control assembly 7 to dispense a desired rate of flow of liquid from the each output port 13 by activating each valve activator 17 to move each valve activator to a valve position that corresponds to a valve position where the size of the corresponding flow opening 21 achieves the desired rate of flow. The controller 23 is operative to record the valve position of each valve activator 17 that corresponds to the desired rate of flow of liquid from the corresponding output port 13. The recorded valve positions correlated to particular flow rates can be used to detect differences between control assemblies 7, or changes over time, that indicate a malfunction.

In a typical application the controller 23 will include a microprocessor that calculates the desired flow rate from the speed of travel, mapped location in the field showing variable rates, and like information. Thus as speed or location changes, the desired flow rate will change and the controller 23 will operate the valve activators 17 to achieve the particular desired flow rate at any given time, and will record the valve position of each valve activator 17 at each flow rate.

The controller 23 can be operated to set each control assembly 7 to dispense the same desired rate of flow of liquid from the each output port 13 by activating each valve activator 17 to move the valve activator 17 to a valve position where the size of the flow opening 21 achieves the desired rate of flow, and compare a valve position of the valve activator 17 in a first control assembly 7A with an average of the valve positions of the valve activators 17 in other control assemblies 7 to determine a malfunction.

Thus in a typical liquid application apparatus 1 where all the control assemblies are the same and when travelling straight along a field surface it is desired to have all the control assemblies 7 dispense the same rate of flow, if one of the valve activators 17 is at a valve position when dispensing the desired flow rate that is significantly different from the valve positions of the valve activators 17 in the other control assemblies 7 when dispensing the same rate, then a malfunction is indicated. The valve positions are directly related to the size of the flow openings 21 such that if the valve position of the valve activator 17 of the first control assembly 7A is at a valve position indicating the flow opening 21 is larger than the size of the flow openings 21 indicated by the valve positions of the other control assemblies 7, a restriction at the output port 13 or downstream therefrom is indicated. And conversely if the indicated flow opening in the first control assembly 7A is smaller than those in the other control assemblies 7, then the output port 13 or an orifice, such as a nozzle orifice, downstream from the output port is larger than it should be which may be caused by wear, an error in the choice of nozzles, damage that has caused a leak, or the like.

Figure 4:
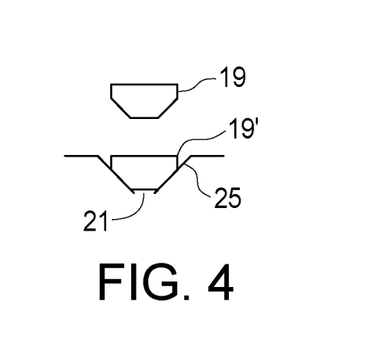
FIG. 4 is a schematic side view of the valve of a control assembly of the embodiment of FIG. 1 showing the valve in the open and closed positions.

The controller 23 is also operative to compare a valve position of the valve activator 17 in each control assembly 7 with an initial valve position thereof to determine a malfunction. As schematically illustrated in FIG. 4 the valve positions range from an open position, where the valve 19 is remote from the valve seat 25 and the flow opening 21 is a maximum size, to a closed position where the valve 19' is fully down in the valve seat 25 and the size of the flow opening 21 is zero. When during operation if a valve position in any of the control assemblies 7 moves from the initial valve position toward the open valve position to maintain the desired rate of flow of liquid, an increased resistance to flow through the outlet port is indicated. Similarly when a valve position moves from the initial valve position toward the closed valve position to maintain the desired flow of liquid, a decreased resistance to flow through the outlet port is indicated.

FIG. 2 schematically illustrates a control assembly 7 that comprises a sprayer nozzle 27 connected to the output port 13 which is configured to dispense known rates of liquid flow at known operating pressures within an operating pressure range. In a typical sprayer for full coverage of a surface each control assembly will have such a nozzle 27 and the liquid information sensor 15 will be provided by a pressure sensor 15A that is operative to measure liquid pressure at the outlet port 13. As is known in the art the actual rate of flow of liquid is determined indirectly by determining the flow through the nozzle 27 at a sensed pressure, and wherein the valve activator 17 is operative to selectively open the valve 19 to correspondingly increase liquid pressure at the outlet port 13 and close the valve 19 to correspondingly decrease liquid pressure at the outlet port 13 to achieve the operating pressure calculated to dispense the desired rate of flow of liquid from the output port 13.

During operation the controller 23 is operative to detect an obstructed nozzle 27 by receiving valve position information from the valve activator 17 indicating the valve activator 17 has rotated the valve 19 to decrease the size of the flow opening 21. A blocked nozzle 27 will restrict flow out through the output port 13 such that the pressure at the output port 13 increases, causing the valve activator 17 to move the valve 19 to close the flow opening 21 to reduce the pressure to that pressure that would provide a flow rate through an unobstructed nozzle 27.

Similarly the controller 23 is operative to detect an enlarged nozzle 27 by receiving valve position information from the valve activator 17 indicating the valve activator 17 has rotated the valve 19 to increase the size of the flow opening 21. An enlarged nozzle 27 will increase the flow out through the output port 13 such that the pressure at the output port 13 decreases, causing the valve activator 17 to move the valve 19 to open the flow opening 21 to increase the pressure to that pressure that would provide a flow rate through a nozzle 27 that was the correct size.

Similarly again the controller 23 is operative to detect a nozzle 27 in the first control assembly 7A with an orifice size that does not correspond to nozzles 27 in the other control assemblies 7 by receiving valve position information from the valve activator 17 in the first control assembly 7A indicating the valve activator 17 is at a valve position that does not substantially correspond to valve positions of the other control assemblies 7.

FIG. 3 schematically illustrates a control assembly 7 where the output port 13 is open to the atmosphere and the liquid information sensor is a flow sensor 15B that is operative to measure liquid flow through the control body 9 and send liquid flow information to the controller 23. In a liquid application apparatus 1 using the control assemblies of FIG. 3 with the output ports open to the atmosphere the controller 23 is connected to receive liquid flow information from each flow sensor 15B and open or close the corresponding valve 19 to increase or decrease the size of the flow opening 21 to the size that achieves a desired rate of flow of liquid from the corresponding output port 13.

In an application such as dispensing a stream of liquid fertilizer where the only concern is the rate of liquid flow from the output port, the pressure in the supply conduit 5 is not a factor in the determination of flow rate or in providing a satisfactory spray pattern. Typically an open conduit 29 can be connected to the output port 13 to direct the liquid from the output port 13 to the desired location, such as a furrow or just to a location in proximity to the ground where contact of the liquid fertilizer with growing plants is minimized.

The controller 23 receives valve position information indicating a relative position of the valve 19 in each control assembly. The valve 19 could be operated by a linear actuator with the controller 23 receiving valve position information from the linear actuator however conveniently the position controlled valve activator 17 is connected to incrementally open and close the corresponding valve 19 and the controller 23 receives valve position information from the valve activator 17 and activates each valve activator to move the valve activator 17 to a valve position corresponding to a valve position where the size of the flow 21 opening achieves the desired rate of flow of liquid from the corresponding output port 13.

With this known valve position information the controller 23 is operative to compare the valve position of the valve activator 17 in one control assembly with an average of the valve positions of the valve activators of the other control assemblies to determine an increased or decreased restriction in liquid flow from the output port 13. The controller 23 also compares the valve position of each valve activator with an initial valve position of the valve activator in the first control assembly to determine an increased or decreased restriction to flow through the output port 13. Increased restriction will indicate for example a plugged output port while decreased restriction will indicate for example some damage that has opened up the output port.

Figure 5:
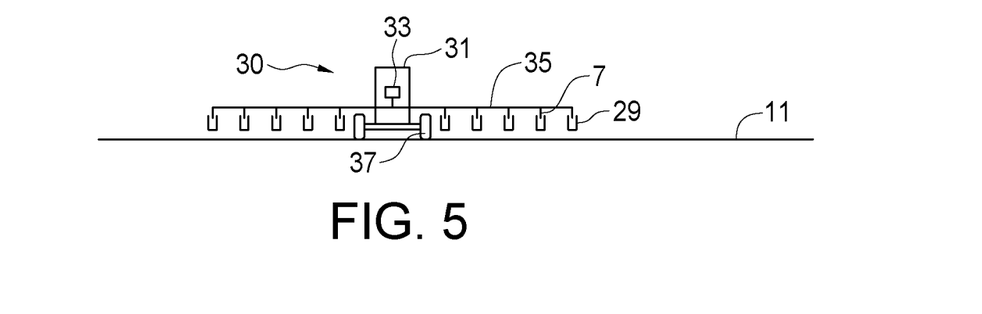
FIG. 5 is a schematic rear view of a liquid fertilizer applicator apparatus with the liquid application apparatus of FIG. 1 mounted thereon.
Figure 6:
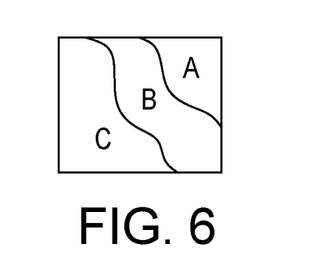
FIG. 6 is a schematic top view of field map showing field portions where variable desired flow rates are to be applied on the various field portions

FIG. 5 schematically illustrates a liquid fertilizer applicator apparatus 30 of the present disclosure comprising a fertilizer tank 31 and a pump 33 operative to draw liquid fertilizer from the tank 31 and direct pressurized liquid fertilizer through a supply conduit 105 at a selected supply pressure. A plurality of the control assemblies 7 described above and shown in FIG. 3 with a valve 19 controlled by a valve activator 17 and a flow sensor 15B enclosed in a control body 9 are spaced along a width of an agricultural implement 35 mounted on wheels 37 for movement along a ground surface in an operating travel direction. The controller 23 is connected to receive liquid flow information from each flow sensor 15B and activate each valve activator 17 to incrementally open or close the corresponding valve 19 to increase or decrease the rate of flow of liquid fertilizer from the corresponding output port 13 to achieve a desired rate of flow of liquid fertilizer through the output port 13. The controller 23 also will receive valve position information from each valve activator 17 so that malfunctions can be detected early. With an external guidance system using global positioning satellites and the like, the controller 23 can also determine a desired rate of flow for each control assembly 7 that is dependent on a speed of each control assembly 7, or on a variable desired flow rate for mapped field portions A, B, C as schematically illustrated in FIG. 6.

An open conduit 29 connected to each output port 13 receives liquid fertilizer and directs the liquid fertilizer to a location in proximity to the ground surface 11 to minimize contact with plants extending up from the ground.

The valve activator 17 can be provided by a stepper motor such as is known in the art however these stepper motors typically draw significantly more current than a direct drive electric motor. In a wide agricultural sprayer of the type contemplated for use with the presently disclosed liquid application apparatus 1 providing electric power for a large number of valve activators 17 that will be needed is problematic.

In a typical application the valve position for each valve activator 17 is determined by activating the valve activator 17 to decrease the size of the corresponding flow opening to zero as in the position of the valve 19' in FIG. 4 where the valve 19 is fully down in the valve seat 25 and the size of the flow opening 21 is zero. This position where the valve 19 is seated in the valve seat 25 gives a reference position and measuring rotation of the electric motor 39 of the valve activator 17, as seen in FIG. 7, as the valve activator 17 is activated to increase the size of the flow opening 21, provides a degree of movement of the valve 19 and thus the valve position.

Figure 7:
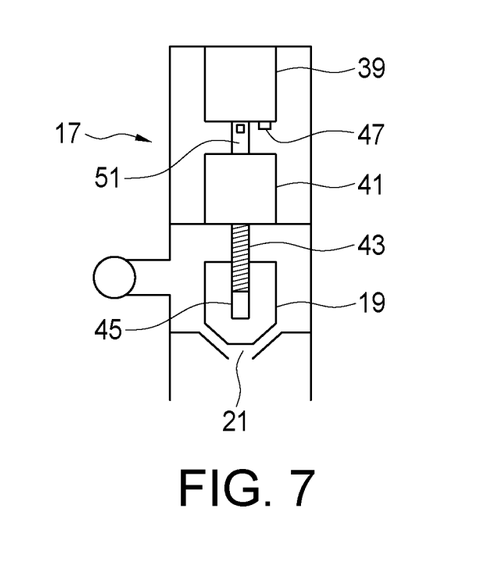
FIG. 7 is a schematic sectional side view of a control assembly of the embodiment of FIG. 1 where the valve activator is provided by an electric motor and speed reducing assembly with a Hall effect sensor operative to send pulses to the controller to determine valve position.

FIG. 7 schematically illustrates the valve activator 17 provided by the electric motor 39 and a speed reducing assembly 41 driven by the motor 39 and connected to the valve 19 such that the motor 39 incrementally activates the valve 39 through a threaded output shaft 43 of the speed reducing assembly 41 which rotates in a threaded hole 45 defined in the valve 19 such that the valve 19 moves up or down as the output shaft 43 rotates in one direction or the other.

Figure 8:
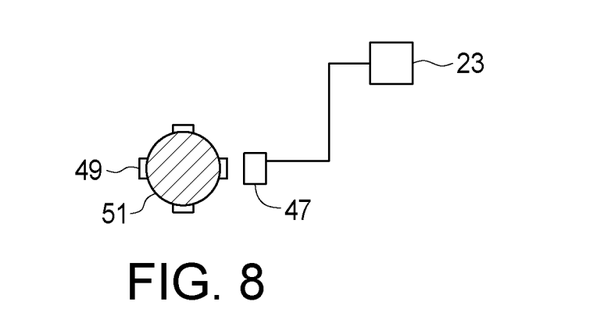
FIG. 8 is a schematic sectional end view of the arrangement of the electric motor shaft with magnets mounted thereon, and the Hall effect sensor.

The valve activator 17 further comprises a Hall effect sensor 47 that is operative to send pulses to the controller 23 as the electric motor 39 rotates and the controller 23 uses the pulses to count the revolutions of the motor 39 and to determine the valve position. As schematically illustrated in FIG. 8, magnets 49 are mounted on the shaft 51 of the electric motor 39 and as the shaft 51 rotates, the Hall effect sensor 51 detects the magnets 49 as they pass and sends a pulse to the controller 23 each time a magnet 49 passes the sensor 47.

For example the speed reducing assembly 41 may use gears to reduce the rotational speed 248:1 such that the motor shaft 51 must rotate 248 times to turn the output shaft 43 one revolution. With a relatively fine pitch on the threads of the output shaft 43 very precise control of the valve position can be provided. FIG. 8 also shows 4 magnets mounted on the motor shaft 51 such that for each rotation of the shaft 51, 4 pulses are sent to the controller 23, such that for each revolution of the output shaft 43, 4×248=992 pulses will be sent to the controller 23. A second Hall effect sensor can be mounted to sense the magnets 49, such that 1984 pulses will be sent to the controller 23.

The Hall effect sensor 47 then is operative to send a plurality of pulses to the controller 23 as the electric motor 39 rotates through one revolution. It is contemplated that, to provide satisfactory valve position information the Hall effect sensor 47 should send at least 500 pulses to the controller 23 as the output shaft 43 of the speed reducing assembly 41 rotates through one revolution. As described above about 2000 or more pulses can readily be provided.

Depending on the particular configuration of the control assembly a slight change in the size of the flow opening 21 can have a significant effect on the rate of flow through the flow opening and the larger the number of pulses per revolution, the finer is the control of the flow rate.

The present disclosure provides a method of determining a malfunction in a liquid application apparatus 1, where the liquid application apparatus 1 comprises a plurality of control assemblies 7, each control assembly 7 comprising a control body 9 with an input port 11 connected to receive pressurized liquid from a supply conduit 5 at a supply pressure, and an output port 13 each control assembly 7 comprising a liquid information sensor 15 and a position controlled valve activator 17 where the valve activator 17 is operative to incrementally activate a valve 19 to increase or decrease a size of a flow opening 21 between the input port 11 and the output port 13. The method comprises receiving liquid information from the liquid information sensor 15 in each control assembly 7 and valve position information from the valve activator 17 in each control assembly 7 and setting each control assembly 7 to dispense a desired rate of flow of liquid from the each output port 13 by activating each valve activator 17 to move the valve activator 17 to a valve position where the size of the corresponding flow opening 21 achieves the desired rate of flow.

The method further comprises setting each control assembly 7 to dispense the same desired rate of flow of liquid from the each output port 13 by activating each valve activator 17 to move the valve activator 17 to a valve position where the size of the flow opening 21 achieves the desired rate of flow, and comparing a valve position of the valve activator 17 in a first control assembly 7A with the valve positions of the valve activators 17 in other control assemblies 7 to determine a malfunction.

Where the valve positions range from an open position, where the flow opening 21 is a maximum size, to a closed position where the flow opening 21 is closed, the method comprises detecting an increased resistance to flow through the outlet port 13 by detecting during operation that a valve position moves from a first valve position toward the open position to maintain the desired flow of liquid and detecting a decreased resistance to flow through the outlet port 13 by detecting during operation that a valve position moves from a first valve position toward the closed position to maintain the desired flow of liquid.

Where each control assembly 7 comprises a sprayer nozzle 27 connected to the output port 13, the nozzles 27 are configured to dispense known rates of liquid flow at known operating pressures within an operating pressure range and in each control assembly the liquid information sensor is a pressure sensor operative to measure liquid pressure at the outlet port, and the desired rate of flow of liquid is determined indirectly by calculating the flow through the nozzle 27 at a sensed pressure. The method then comprises activating the valve activator 17 to open the valve 19 to correspondingly increase liquid pressure at the outlet port 13 and close the valve 19 to correspondingly decrease liquid pressure at the outlet port 13 to achieve the liquid pressure that provides the desired flow rate.

The method further comprises detecting an obstructed nozzle 27 by receiving valve position information from the valve activator 17 indicating the valve activator has rotated the valve 19 to decrease the size of the flow opening 21 and detecting an enlarged nozzle 27 by receiving valve position information from the valve activator 17 indicating the valve activator 17 has rotated the valve 19 to increase the size of the flow opening 21.

The method further comprises detecting a nozzle 27 in the first control assembly 7A with an orifice size that does not correspond to the orifice sizes of the nozzles 27 in other control assemblies 7 by receiving valve position information from the valve activator 17 in the first control assembly 7A indicating the valve activator 17 is at a valve position that does not substantially correspond to valve positions of the other control assemblies 7.

The output port 13 can be open to the atmosphere and the liquid information sensor can be a flow sensor 15B with the method comprising measuring liquid flow through the control body 9 and activating each valve activator 17 to move the valve activator to a valve position where the size of the corresponding flow opening achieves the desired rate of flow.

The present disclosure provides a liquid application apparatus 1 that can detect malfunctions such as nozzles 27 that are the wrong size, blocked, or enlarged by wear or damage. In liquid applications where the liquid is not dispensed through pressure regulated nozzles, such as in a liquid fertilizer apparatus 30, flow rates through the output port 13 are detected directly by providing a flow sensor 15B in the control body, and the controller 23 simply activates the valve 19 to open or close the flow opening 21 until the desired flow rate is attained.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A liquid application apparatus comprising:
   a pressurized liquid source directing a flow of liquid at a selected supply pressure through a supply conduit;
   a plurality of control assemblies, each control assembly comprising a control body with an input port connected to receive pressurized liquid from the supply conduit at the supply pressure, and an output port;
   each control assembly comprising a liquid information sensor and a position controlled valve activator, the valve activator operative to incrementally move a valve to increase or decrease a size of a flow opening between the input port and the output port; and
   a controller connected to receive liquid information from the liquid information sensor in each control assembly and valve position information from the valve activator in each control assembly and operative to activate each valve activator to move each valve activator to a valve position where the size of the corresponding flow opening achieves a desired rate of flow of liquid from the corresponding output port;

wherein the controller is operative to record the valve position of each valve activator that corresponds to the desired rate of flow of liquid from the corresponding output port;

wherein the valve position for each valve activator is determined by activating the valve activator to decrease the size of the corresponding flow opening to zero, and measuring rotation of an electric motor of the valve activator as the valve activator is activated to increase the size of the flow opening;

wherein the valve activator is provided by the electric motor and a speed reducing assembly driven by the motor and connected to the valve such that the motor incrementally activates the valve through an output shaft of the speed reducing assembly.

2. The apparatus of claim 1 wherein the valve activator further comprises a Hall effect sensor operative to send pulses to the controller as the electric motor rotates and wherein the controller uses the pulses to count the revolutions of the motor.

3. The apparatus of claim 2 wherein the Hall effect sensor is operative to send a plurality of pulses to the controller as the electric motor rotates through one revolution, and the Hall effect sensor is operative to send at least 500 pulses to the controller as the output shaft of the speed reducing assembly rotates through one revolution.

4. The apparatus of claim 1 wherein the controller is operative to set each control assembly to dispense the same desired rate of flow of liquid from the each output port by activating each valve activator to move the valve activator to a valve position where the size of the flow opening achieves the desired rate of flow, and wherein the controller is operative to compare the valve position of the valve activator in a first control assembly with the valve positions of the valve activators in other control assemblies to determine a malfunction.

5. The apparatus of claim 1 wherein the controller is operative to compare a valve position of the valve activator in each control assembly with an initial valve position thereof to determine a malfunction.

6. The apparatus of claim 5 wherein valve positions range from an open valve position, where the flow opening is a maximum size, to a closed valve position where the size of the flow opening is zero, and wherein, when during operation one of the valve positions moves from the initial valve position toward the open valve position to maintain the desired flow of liquid, an increased resistance to flow from the outlet port is indicated.

7. The apparatus of claim 5 wherein, when during operation the valve position moves from the initial valve position toward the closed valve position to maintain the desired flow of liquid, a decreased resistance to flow from the outlet port is indicated.

8. The apparatus of claim 1 wherein each control assembly comprises a sprayer nozzle connected to the output port which is configured to dispense known rates of liquid flow at known operating pressures within an operating pressure range, and wherein in each control assembly the liquid information sensor is a pressure sensor operative to measure liquid pressure at the outlet port and an actual rate of flow of liquid is determined indirectly by determining the flow through the nozzle at a sensed pressure, and wherein the valve activator is operative to selectively open the valve to correspondingly increase liquid pressure at the outlet port and close the valve to correspondingly decrease liquid pressure at the outlet port to achieve the operating pressure calculated to dispense the desired rate of flow of liquid from the output port.

9. The apparatus of claim 8 wherein during operation the controller is operative to detect in each control assembly an obstructed nozzle by receiving valve position information from the corresponding valve activator indicating the valve activator has moved the valve to decrease the size of the flow opening.

10. The apparatus of claim 9 wherein during operation the controller is operative to detect in each control assembly an enlarged nozzle by receiving valve position information from the valve activator indicating the valve activator has moved the valve to increase the size of the flow opening.

11. The apparatus of claim 8 wherein the controller is operative to detect a nozzle in the first control assembly with an orifice size that does not correspond to nozzles in other control assemblies by receiving valve position information from the valve activator in the first control assembly indicating the valve activator is at a valve position that does not substantially correspond to valve positions of the other control assemblies.

12. The apparatus of claim 1 wherein in each control assembly the output port is open to the atmosphere and the liquid information sensor is a flow sensor operative to measure liquid flow through the control body and send liquid flow information to the controller.

13. The apparatus of claim 12 wherein the controller is operative to compare the valve position of the valve activator in a first control assembly with an average of the valve positions of the valve activators of the other control assemblies to determine an increased restriction in flow through the output port.

14. The apparatus of claim 12 wherein the controller is operative to compare the position of the valve activator in a first control assembly with an initial calibrated position of the valve activator in the first control assembly to determine an increased restriction in flow through the output port.

15. The apparatus of claim 1 wherein the plurality of control assemblies spaced along a width of an agricultural implement mounted on wheels for movement along a ground surface, and the controller is operative to determine a desired rate of flow for each control assembly that is dependent on a speed of each control assembly or on a variable desired rate for mapped field portions.

16. A liquid application apparatus comprising:

a pressurized liquid source directing a flow of liquid at a selected supply pressure through a supply conduit;

a plurality of control assemblies, each comprising a valve and a flow sensor enclosed in a control body, the flow sensor operative to measure liquid flow through the control body, the control body having an input port connected to receive pressurized liquid from the supply conduit at the supply pressure, and an output port;

a controller connected to receive liquid flow information from each flow sensor and to open or close the corresponding valve to increase or decrease a size of a flow opening between the input port and the output port to the size that achieves a desired rate of flow of liquid through the corresponding output port;

wherein the controller receives valve position information indicating a relative position of the valve in each control assembly;

wherein each control assembly comprises a position controlled valve activator connected to incrementally open and close the corresponding valve and wherein the controller is connected to receive valve position information from the valve activator in each control assembly and is operative to activate each valve activator to move the valve activator to a valve position corresponding to a valve position where the size of the flow opening achieves the desired rate of flow of liquid through the corresponding output port;

wherein the valve position for each valve activator is determined by activating the valve activator to decrease the size of the corresponding flow opening to zero, and measuring rotation of a motor of the valve activator as the valve activator is activated to increase the size of the flow opening;

wherein the valve activator is provided by the motor and a speed reducing assembly driven by the motor and connected to the valve such that the motor incrementally activates the valve through an output shaft of the speed reducing assembly.

17. The apparatus of claim 16 wherein the valve activator further comprises a Hall effect sensor operative to send a plurality of pulses to the controller as the motor rotates through one revolution, and the Hall effect sensor is operative to send at least 500 pulses to the controller as the output shaft of the speed reducing assembly rotates through one revolution.

18. The apparatus of claim 16 wherein the controller is operative to compare the valve position of the valve activator in a first control assembly with an average of the valve positions of the valve activators of the other control assemblies to determine an increased or decreased restriction to flow through the output port.

19. The apparatus of claim 16 wherein the controller is operative to compare the valve position of the valve activator in a first control assembly with an initial valve position of the valve activator in the first control assembly to determine an increased or decreased restriction to flow through the output port.

20. A method of determining a malfunction in a liquid application apparatus, where the liquid application apparatus comprises a plurality of control assemblies, each control assembly comprising a control body with an input port connected to receive pressurized liquid from a supply conduit at a supply pressure, and an output port, and each control assembly comprising a liquid information sensor and a position controlled valve activator, the valve activator operative to incrementally activate a valve to increase or decrease a size of a flow opening between the input port and the output port, the method comprising:

receiving liquid information from the liquid information sensor in each control assembly and valve position information from the valve activator in each control assembly and activating each valve activator to move the valve activator to a valve position where the size of the corresponding flow opening achieves the desired rate of flow;

comparing a valve position of the valve activator in a first control assembly with an initial valve position of the valve activator in the first control assembly to determine a malfunction;

detecting a decreased resistance to flow through the outlet port by detecting during operation that a valve position moves from a first valve position toward the closed position to maintain the desired flow of liquid.

21. The method of claim 20 comprising setting each control assembly to dispense the same desired rate of flow of liquid from the each output port by activating each valve activator to move the valve activator to a valve position where the size of the flow opening achieves the desired rate of flow, and comparing a valve position of the valve activator in a first control assembly with the valve positions of the valve activators in other control assemblies to determine a malfunction.

22. The method of claim 20 wherein valve positions range from an open position, where the flow opening is a maximum size, to a closed position where the flow opening is closed, and detecting an increased resistance to flow through the outlet port by detecting during operation that a valve position moves from a first valve position toward the open position to maintain the desired flow of liquid.

23. The method of claim 20 wherein each control assembly comprises a sprayer nozzle connected to the output port, the sprayer nozzles configured to dispense known rates of liquid flow at known operating pressures within an operating pressure range, and wherein in each control assembly the liquid information sensor is a pressure sensor operative to measure liquid pressure at the outlet port and the desired rate of flow of liquid is determined indirectly by calculating the flow through the nozzle at a sensed pressure, the method comprising activating the valve activator to open the valve to correspondingly increase liquid pressure at the outlet port and close the valve to correspondingly decrease liquid pressure at the outlet port to achieve the operating pressure calculated to dispense the desired rate of flow of liquid from the output port.

24. The method of claim 23 comprising detecting an obstructed nozzle by receiving position information from the valve activator indicating the valve activator has moved the valve to decrease the size of the flow opening.

25. The method of claim 23 comprising detecting an enlarged nozzle by receiving position information from the valve activator indicating the valve activator has moved the valve to decrease the size of the flow opening.

26. The method of claim 23 comprising detecting a nozzle in the first control assembly with an orifice size that does not correspond to the orifice size of the nozzles in other control assemblies by receiving position information from the valve activator in the first control assembly indicating the valve activator is at a valve position that does not substantially correspond to valve positions of the other control assemblies.

27. The method of claim 20 wherein the output port is open to the atmosphere and wherein the liquid information sensor is a flow sensor, and the method comprises measuring liquid flow through the control body and activating each valve activator to move the valve activator to a valve position where the size of the corresponding flow opening achieves the desired rate of flow.

* * * * *